United States Patent [19]

Block

[11] 4,182,012
[45] Jan. 8, 1980

[54] METHOD OF MAKING A PISTON WITH A GUDGEON PIN

[75] Inventor: Albert Block, Glucksburg, Fed. Rep. of Germany

[73] Assignee: Danfoss A/S, Nordborg, Denmark

[21] Appl. No.: 857,771

[22] Filed: Dec. 5, 1977

Related U.S. Application Data

[62] Division of Ser. No. 738,712, Nov. 4, 1976, Pat. No. 4,095,513.

[30] Foreign Application Priority Data

Nov. 5, 1975 [DE] Fed. Rep. of Germany ....... 2549550

[51] Int. Cl.$^2$ ................ B23P 15/10; B23P 11/00
[52] U.S. Cl. ................ 29/156.5 A; 29/513; 228/136
[58] Field of Search ............ 29/156.5 R, 156.5 A, 29/526, 509, 513; 228/136; 123/193 P; 92/187, 231, 260; 403/150, 154, 163, 25

[56] References Cited

U.S. PATENT DOCUMENTS

| | | | |
|---|---|---|---|
| 212,645 | 2/1879 | Baumann | 29/509 |
| 1,296,402 | 3/1919 | Kahn | 29/513 |
| 1,318,092 | 10/1919 | Lockwood | 29/513 |
| 1,771,751 | 7/1930 | Finley | 403/154 |
| 1,810,423 | 6/1931 | Hatch | 403/154 |
| 2,362,429 | 11/1944 | Blanchard | 403/150 |
| 2,599,082 | 6/1952 | Wells | 92/260 |
| 2,752,213 | 6/1956 | Swart et al. | 92/260 |
| 2,944,326 | 7/1960 | Stadthaus et al. | 228/136 |

FOREIGN PATENT DOCUMENTS

| | | | |
|---|---|---|---|
| 2152462 | 4/1973 | Fed. Rep. of Germany | 123/193 P |
| 22561 | of 1911 | United Kingdom | 123/193 P |

*Primary Examiner*—Daniel C. Crane
*Attorney, Agent, or Firm*—Wayne B. Easton

[57] ABSTRACT

The invention relates to a piston assembly for compressor and the method of making the assembly. A piston body is molded with spaced apart downwardly open grooves formed with concave semicylindrically shaped summits and parallel side walls. The summits and sidewalls are formed with pimples. A connecting rod pin having a connecting rod attached thereto is press fitted into the grooves. The pimples may serve as weld pimples by being softened by a welding current. The pimples on the sidewalls may alternatively be mechanically swaged to press inwardly against the rod to hold it in its installed position.

2 Claims, 4 Drawing Figures

METHOD OF MAKING A PISTON WITH A GUDGEON PIN

This is a divisional application of application Ser. No. 738,712 filed Nov. 4, 1976, now U.S. Pat. No. 4,095,513 and issued June 20, 1978.

The invention relates to a piston, particularly for the compressor of a small refrigerator, comprising a gudgeon pin.

Known pistons of this kind have a throughgoing transverse hole for receiving the gudgeon pin by means of which the piston is connected to its connecting rod. This transverse hole must be produced by drilling after the rough piston body has been made. This is time-consuming. The same applies to pistons that are assembled from a plurality of segments, including sleeves for receiving the pin.

The object of the invention is to provide a piston with gudgeon pin that can be made much more simply.

This object is achieved according to the invention in that the piston in the form of a moulding is provided in the region of the ends of the pin with a groove emplacement which is open to the back of the piston and in which the pin is held by pressing and/or welding.

With this construction, the gudgeon pin is no longer held within a cylindrical surface but in an open groove emplacement. This can be produced at the same time as the piston is being moulded.

As a rule, any subsequent machining of this groove emplacement is superfluous. The forces to be transmitted from the gudgeon pin during the pressure stroke of a compressor or a pump are taken up without difficulty by the base of the groove emplacement; the forces to be transmitted during the suction stroke are comparatively much smaller (analogous considerations apply to a motor). It is therefore sufficient to hold this pin in the open groove emplacement by pressing and/or welding. The construction as a moulding also permits other shaping to be provided, e.g. to give one end of the piston a depression for adaptation to a suction valve leaf spring without the need for subsequent machining.

It is of particular advantage if the piston is a moulding of sintered metal. The piston can for example consist of sintered powder of steel, iron or aluminium; it may also consist of special alloys, contain additives for self-lubrication or possess a certain porosity for receiving lubricating oil. The moulding is made under high pressure and sintered simultaneously or subsequently. This produces mouldings having a high dimensional accuracy, in which it is ensured that the open groove emplacement will not have to be machined subsequently.

Another advantage is obtained if the groove emplacement terminates within the piston periphery at both sides. The cylindrical peripheral surface of the piston is therefore not interrupted by a hole or the like. Uniform running properties and sealing conditions are therefore obtained over the entire piston periphery. In particular, the length of the piston can be shorter for a given degree of sealing. Further, the gudgeon pin is fixed in the axial direction; one requires no locking rings or the like for achieving axial location.

The groove emplacement desirably has a base of semi-circular cross-section. In this way one obtains a large contact surface for the pin so that the forces occurring during the pressure stroke can be transmitted with low surface pressures.

The sides of the groove emplacement may extend substantially parallel to the piston axis and adjoin the largest diameter of the semi-circle. A slight taper is permissible. In this way the groove emplacement can be easily deformed and the pin can be easily introduced.

In the simplest case, the pin is held in the groove emplacement by an interference fit. The interference fit can be achieved in that the pin is pressed into the groove emplacement with an appropriate force. However, it can also be brought about in that the piston is heated or the pin is cooled before the pin is inserted.

It is also possible to press material inwardly in the region of the sides of the groove emplacement. This deformation of material ensures that the pin remains in the groove emplacement.

For this purpose it is particularly favourable if the groove emplacement extends from a pressed face which is substantially perpendicular to the piston axis and the sides are shorter than the pin radius. By exerting pressure onto the pressed face in the region of the sides, the latter deform inwardly and partially come to lie against the pin.

In a preferred embodiment, the pressed face carries at least one press pimple near each side. When the pressure is exerted on this press pimple, high specific pressures are achieved which result in relatively extensive deformations in a predetermined region.

The press pimples may, before pressing, have a surface extending at an angle of 60° to 80° to the piston axis. One can then press the appropriate tool substantially perpendicular to the surface of the press pimples and thereby allow the pressing forces to act in the direction of the desired deformation.

The deformation by pressing as here described may also be performed with simultaneous heating of the piston, i.e. as so-called thermal pressing.

Securing the piston in the groove emplacement can also be by way of welding. It will be best if the deformations by pressing as described are combined with welding. In particular, the inwardly pressed material can be welded to the pin. When using press pimples, which will then also serve as weld pimples, one obtains defined securely holding welding points with comparatively small welding currents.

Further, each section of the groove emplacement may be provided in the base with at least one weld pimple for welding to the pin. This weld pimple is softened by the welding current whilst the pin is being pressed into the groove emplacement and, when the pin abuts the base of the groove emplacement, it forms a solid welding point.

A method of making such a piston is characterised in that the piston, substantially of metallic powder, is pressed in a mould and sintered and the pin is later inserted in the unmachined groove emplacement and there pressed tight and/or welded in position.

It is also possible to take other additional securing measures; for example, the pin can be pressed into the groove emplacement with the interpositioning of adhesive.

Further, the groove emplacement can, particularly for sintered mouldings, be brought to the accurate dimensions by means of a calibrating mandrel. This permits dimensional differences up to about 30$\mu$ to be corrected.

The invention will be described in more detail with reference to the embodiment shown by way of example in the drawing, wherein.

Figure 1:
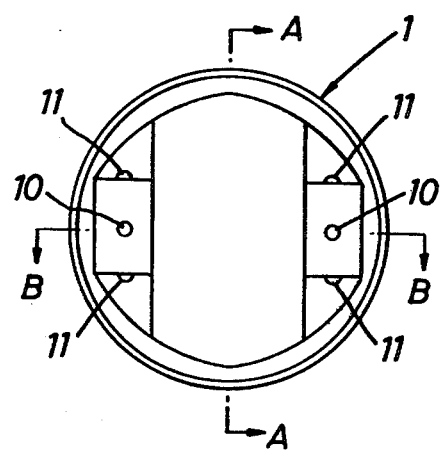
FIG. 1 is a view from the bottom of the piston.
Figure 2:
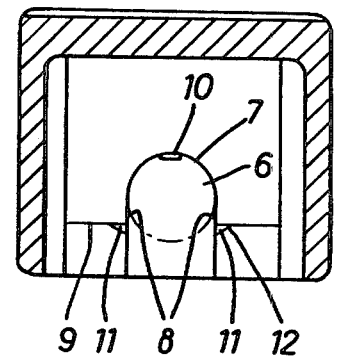
FIG. 2 is a section on the line A—A in FIG. 1.
Figure 3:
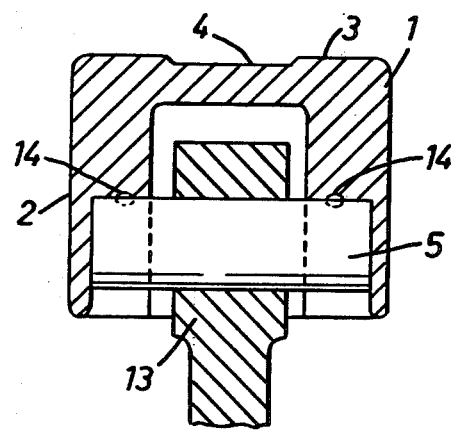
FIG. 3 is a section on the line B—B in FIG. 1 with the gudgeon pin inserted.

A piston 1 is formed by a moulding of sintered steel which has a cylindrical peripheral surface 2 which is continuous all round over the entire length of the piston and has at the end 3 a depression 4 for adaptation to a suction valve leaf spring which, in the case of small refrigerators, is attached to that side of a valve plate that faces the suction chamber. Serving to receive a gudgeon pin 5, there is a two-part groove emplacement 6 of which the base 7 has a semi-circular cross-section and the sides 8 extend substantially parallel to the axis, adjoin the largest diameter of the semi-circle, are shorter than the radius of the pin and extend from a pressed face 9 which is substantially perpendicular to the piston axis. In each section of the groove emplacement 6, a slightly projecting weld pimple 10 is provided at the base 7. Press pimples 11 of which the surface 12 is at an angle of 60° to 80° to the piston axis are formed on the pressed face 9 near the sides 8.

The piston as so far described can be made in a conventional sinter pressure mould with such high accuracy that no further surface machining or, at most, machining of the peripheral surface 2 will be required.

The pin 5, onto which the connecting rod 14 has already been pushed, is pressed with both of its ends into the respective sections of the groove emplacement 6. A welding current pulse is simultaneously conducted through the weld pimple 10. The pimple softens, the pin comes to lie against the base 7 of the groove emplacement 6 under the pressure, and a clean welding point is obtained in the regions 14.

Figure 4:
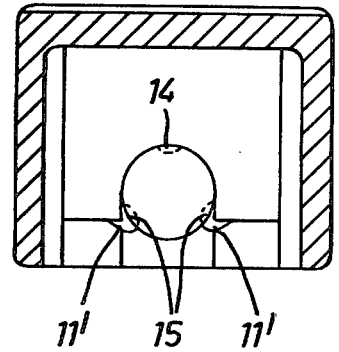
FIG. 4 is a section similar to FIG. 2 but with the gudgeon pin inserted.

Subsequently, welding tools are pressed with an appropriate pressure onto the surface 12 of the press pimples 11 at an angle of about 10° to 30° to the piston axis. Under this pressure and possibly also heating, the sides 8 are deformed inwardly in the region of the pimples until they come to lie against the pin 6, as is indicated by the reference numerals 11' in FIG. 4. A welding current pulse will then result in further clean welded projections in the regions 15.

Certain welding machines with condenser discharge may serve to produce the welding pulses. The welding energy depends on the size of the piston and the desired weld regions. In one example, the piston had a diameter of 26 mm. A minimum energy of 1000 Ws was required to the welding.

The mouldings can also be produced as a casting, pressure casting, thermal pressing, cold pressing or the like.

However, in many cases one can make do without welding. One can then achieve the desired deformations by cold or thermal pressing.

I claim:

1. A method of making a piston assembly for compressors comprising the steps of molding a piston body having a circumferentially uninterrupted cylindrically shaped surface portion with two spaced apart downwardly open U-shaped grooves each formed with a curved summit and parallel sidewalls interiorly of said surface portion, said sidewalls being parallel to the axis of said piston body and said grooves being formed with pimples near lower edges of said side walls, press fitting a connecting rod pin into said grooves by moving the pin parallel to the axis of the piston, and transforming the shapes of said pimples to press against said pin to provide sole means in absence of any other means for fastening said connecting rod pin to said piston body.

2. A method according to claim 1 wherein said transforming step includes welding said pin in place in said grooves through said pimples.

* * * * *